(12) United States Patent
Kaifu et al.

(10) Patent No.: US 6,528,796 B1
(45) Date of Patent: Mar. 4, 2003

(54) RADIATION IMAGE PICKUP DEVICE AND RADIATION IMAGE PICKUP SYSTEM

(75) Inventors: Noriyuki Kaifu, Hachioji; Akira Funakoshi, Atsugi; Osamu Hamamoto, Isehara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 09/611,147

(22) Filed: Jul. 6, 2000

(30) Foreign Application Priority Data

Jul. 8, 1999 (JP) .......................................... 11-194606
Jun. 22, 2000 (JP) ...................................... 2000-187787

(51) Int. Cl.⁷ ............................................... G01T 1/20
(52) U.S. Cl. ............................ 250/370.11; 250/370.09
(58) Field of Search ........................ 250/370.11, 370.09

(56) References Cited

U.S. PATENT DOCUMENTS

| | | | |
|---|---|---|---|
| 5,569,907 A | * 10/1996 | Meunier | 250/208.1 |
| 5,825,032 A | 10/1998 | Nonaka et al. | 250/370.09 |
| 5,844,242 A | * 12/1998 | Jalink, Jr. et al. | 250/370.09 |
| 5,844,289 A | 12/1998 | Teranishi et al. | 257/432 |
| 5,881,163 A | 3/1999 | Slump et al. | 382/132 |

OTHER PUBLICATIONS

C.H. Slump, et al., "A novel X-ray detector with multiple screen–CCD sensors for real–time diagnostic imaging", SPIE vol. 2708, pp. 450–461. Feb. 2000.

"Portable Digital Radiographic Imager: An Overview", Evren M. Kutlubay, et al., SPIE—The International Society for Optical Engineering, vol. 2708, pp. (742–749), Physics of Medical Imaging, Medical Imaging 1996 (Feb. 11–13, 1996, Newport Beach, California).

* cited by examiner

*Primary Examiner*—Constantine Hannaher
(74) *Attorney, Agent, or Firm*—Fitzpatrick, Cella, Harper & Scinto

(57) ABSTRACT

A large-area and compact radiation image pickup device is provided in which an imaging optical system is arranged between a solid image pickup element and a wavelength converting member, and a radiation such as x-rays as converted into the sensitive wavelength region of the solid image pickup element by the wavelength converting member is guided by the imaging optical systems to convert the radiation into an electric signal by a plurality of photosensors. The radiation that has passed through the wavelength converting member is absorbed by a light transmissive member or a unity magnification erectly imaging optical system, thereby reducing or preventing irradiation of the photosensors or the like with the radiation.

26 Claims, 9 Drawing Sheets

RADIATION IMAGE PICKUP DEVICE AND RADIATION IMAGE PICKUP SYSTEM

BACKGROUND OF THE INVENTION

1. Field of the Invention

The present invention relates to a radiation image pickup device and a radiation image pickup system, and more particularly to a radiation image pickup device and a radiation image pickup system which convert radiations such as x-rays, α-rays, β-rays or γ-rays into a light of a photosensor-detectable wavelength such as a visible light by means of a wavelength converting member such as a scintillator, and detect the converted light through an optical system by the photosensor.

2. Related Background Art

Up to now, x-ray image pickup devices employed for non-destructive examination such as medical diagnosis or internal examination have been mainly systems in which x-rays are projected through an object to be examined (hereinafter simply referred to as "object") such as a human body, and the x-rays which have been transmitted through the object are converted into light by a phosphor, and a film is exposed to the converted light (hereinafter referred to as "film system").

FIG. 1 is a schematically structural view showing an example of an x-ray image pickup device of the film system. Referring to FIG. 1, reference numeral 501 denotes an x-ray source; 502, an object such as a human body (patient) through which x-rays emitted from the x-ray source 501 are projected; 503, a grid designed so that a material that absorbs x-rays and a material that transmits x-rays are alternately disposed for removing scattered x-ray components to improve the resolution; 504, a scintillator that absorbs the x-rays to emit a light; and 505, a film that receives the light from the scintillator 504.

The film system thus structured suffers from problems stated below.

First, because an x-ray image of the object, such as a patient, is captured on the film, it is necessary to develop the film in order to obtain the x-ray image, thus taking labor and time. In the case where the object, such as a patient, is in motion during the radiography or where appropriate exposure is not attained, the radiography must be conducted once more after development of the film. The setting for re-radiography not only lowers the radiography efficiency but also increases the work required for each object, such as a patient, and prevents the efficiency of medical examination in a hospital from being improved.

In addition, it is necessary that the radiographed x-ray image film is kept within an enterprise or a hospital, and in particular, it is necessary that the photographed x-ray image film is kept within the hospital for a given period of time. As a result, the number of films kept in the hospital becomes very large, and there is further required that the films can be taken in and out every time the patient visits hospital. Accordingly, the efficiency of management of the films within the hospital must be also improved.

In addition, there is a case where when the patient changes hospitals, the x-ray films radiographed up to that time must be forwarded to the another hospital through some means in order to prevent re-radiography.

In order to solve the above problems, the digitalization of x-ray image information has been increasingly demanded in recent years. If the x-ray information can be digitalized, not only the x-ray image information can be managed by using a recording medium such as a photo-magnetic disc but also the state of an obtained image can be judged instantly. As a result, a medical doctor or the like can obtain the x-ray image information of the object such as a patient with a preferred angle or amount of exposure at a real time.

Also, if a facsimile machine or other communication systems are employed, it is possible to transfer the x-ray image information to a remote hospital or enterprise in a short period of time. In addition, if the obtained digital x-ray image information is picture-processed by using a computer, diagnosis can be conducted with higher precision, thereby solving the above problems with the film system.

As a device for digitalizing the x-ray information, there been proposed an x-ray image pickup device in which x-rays that have been transmitted by the object are irradiated to and absorbed by a wavelength converting member such as a scintillator, and are then wavelength-converted into a light such as a visible light which is in proportion to the intensity of the irradiated/absorbed x-rays, and in which the light is received by a solid image pickup element such as a CCD which is sensitive to the wavelength of the light, and then converted into a digital information. Also, a medical image generally requires a large number of pixels of, for example, about 2,000×3,000 (6,000,000).

SUMMARY OF THE INVENTION

The present invention has been made to solve the above problems with the conventional devices, and therefore an object of the present invention is to provide a radiation image pickup device and a radiation image pickup system which can preferably be employed in an x-ray image pickup device that demands a large number of pixels.

Another object of the present invention is to provide a large-area, compact radiation image pickup device in which an imaging optical system is disposed between a solid image pickup element and a wavelength converting member, and radiations such as x-rays which have been converted into the sensitive wavelength region of the solid image pickup element by the wavelength converting member are guided by the imaging optical system and converted into an electric signal.

Still another object of the present invention is to provide a radiation image pickup device comprising a wavelength converting member for converting the wavelength of incident radiation into light; an imaging optical system for inputting thereto the light, as wavelength-converted by the wavelength converting member; a plurality of photosensors for receiving light from the imaging optical system; and a light transmissive substrate disposed between the photosensors and the wavelength converting member, for reducing x-rays that have passed through the wavelength converting member.

Yet still another object of the present invention is to provide a radiation image pickup device comprising a wavelength converting member for converting radiation into light; an erectly imaging optical system for inputting thereto the light from the wavelength converting member; and a plurality of photosensors for receiving the light from the erectly imaging optical system.

Yet still another object of the present invention is to provide a radiation image pickup system comprising a radiation image pickup device comprising a wavelength converting member for converting the wavelength of incident radiation into light; an imaging optical system for inputting thereto the light as wavelength-converted by the wavelength converting member; a plurality of photosensors for receiving light from the imaging optical system; and a light transmissive substrate disposed between the photosensors and the wavelength converting member, for reducing x-rays that have passed through the wavelength converting member; a signal processing means for processing a signal from the radiation image pickup device; a display means for displaying a signal from the signal processing means; and a radiation source for generating the radiation.

Yet still another object of the present invention is to provide a radiation image pickup system comprising a radiation image pickup device comprising a wavelength converting member for converting radiation into light; a normal rotation imaging optical system for inputting thereto the light from the wavelength converting member; and a plurality of photosensors for receiving the light from the normal rotation imaging optical system; a signal processing means for processing a signal from the radiation image pickup device; a display means for displaying a signal from the signal processing means; and a radiation source for generating the radiation.

In the present invention, the imaging optical system is disposed between the solid imaging element and the wavelength converting member, radiation such as x-rays, which has been converted into the sensitive wavelength region of the solid image pickup element by the wavelength converting member, is guided by the imaging optical system, and the radiation is converted into an electric signal by the plurality of photosensors. The radiation that has passed through the wavelength converting member is absorbed/shielded by a light transmissive member or a unity magnification normal rotation imaging optical system, so that irradiation of the photosensors or the like with the radiation is reduced or prevented.

This makes it possible to provide an irradiation image pickup device which is miniature, can stably read an image and has a high sensitivity.

Also, there can be provided an irradiation image pickup device that is high in the degree of freedom of the size of the image pickup region and can read a radiation image at a low cost with high performance.

In addition, the radiation image pickup system comprising the radiation image pickup device has high reliability and can reduce the amount of time and increase certainty of the diagnosis, and also can reduce the work necessary to prepare for radiography of an object and the cost for setting. Also, because the running cost of the system is reduced, the cost for non-destructive examination can be reduced.

Briefly describing an example of the radiation image pickup device according to the present invention, arranging a wavelength converting member that converts radiation into light, an imaging optical system that guides the light from the wavelength converting member, a light transmissive substrate and a two-dimensional photosensor that receives the light from the wavelength converting member in the direction of incidence of radiation in the mentioned order, results in a radiation image pickup device using a two-dimensionally arranged lens array as the optical system. Specific structural examples will be described in more detail with reference to the accompanying drawings in the following embodiments. The wavelength converting member such as a scintillator (phosphor) is made of a material used for wavelength-converting the radiation such as x-rays, α-rays, β-rays or γ-rays and generally means a material that converts the radiation into a light having a wavelength within the range of sensitive wavelengths of a photosensor.

BRIEF DESCRIPTION OF THE DRAWINGS

These and other objects, features and advantages of this invention will become more fully apparent from the following detailed description taken with the accompanying drawings in which.

DESCRIPTION OF THE PREFERRED EMBODIMENTS

Now, a description will be given in more detail of preferred embodiments of the present invention with reference to the accompanying drawings.

First Embodiment

Figure 2:
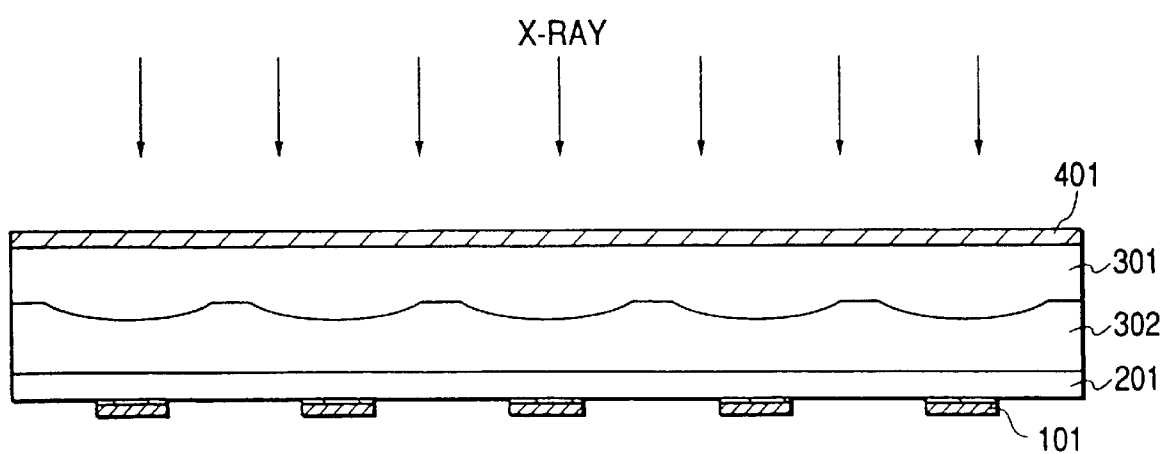
FIG. 2 is a schematic sectional view of the structure of the radiation image pickup device showing an embodiment of the present invention.
Figure 3:
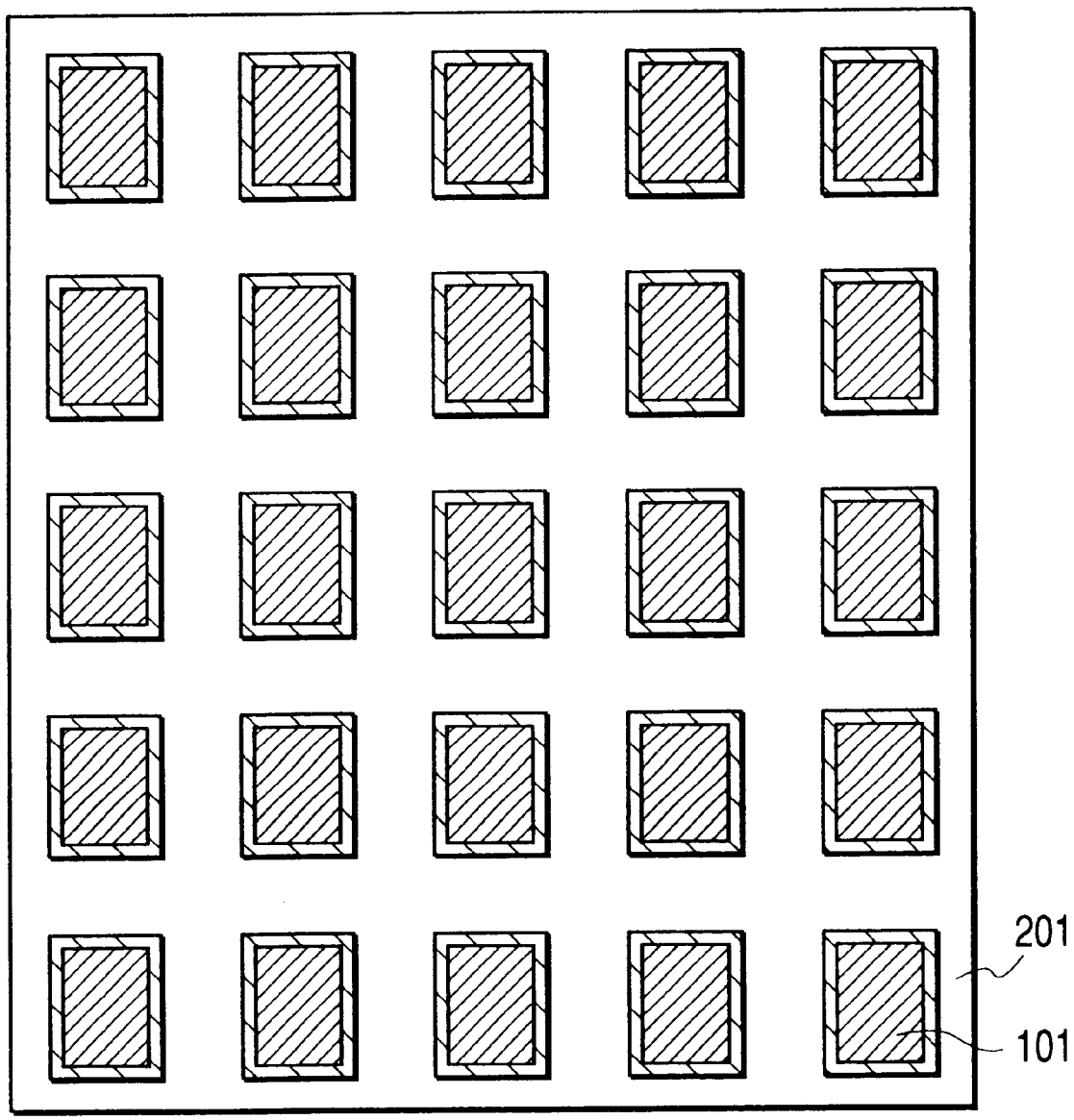
FIG. 3 is a schematic plan view showing an example of the radiation image pickup device viewed from a photoelectric conversion device side of the radiation image pickup device.
Figure 4:
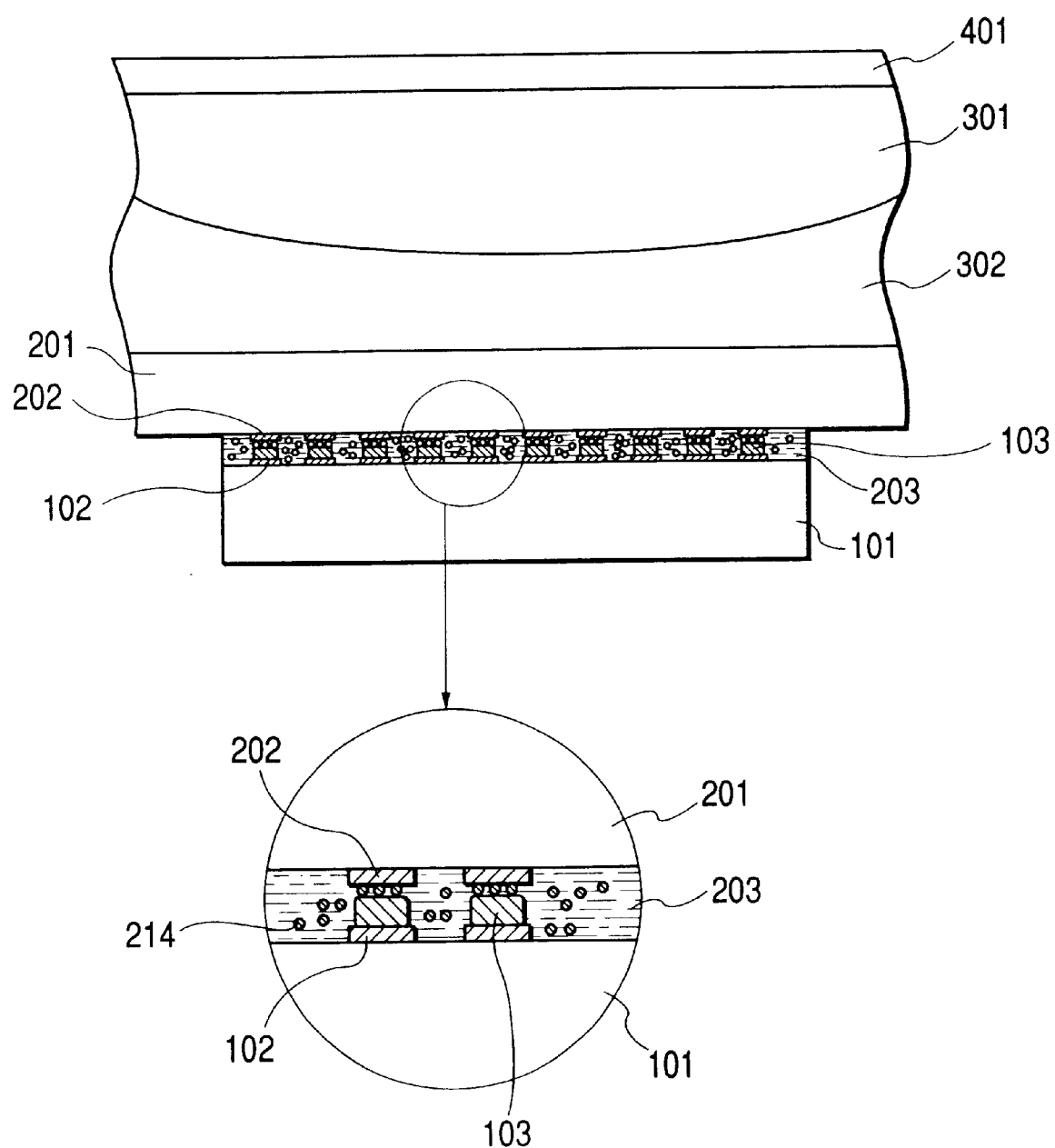
FIG. 4 is a schematic sectional view showing a flip chip mounting structural portion of a photo-electric converting device.

FIG. 2 is a schematic sectional view showing the structure of a radiation image pickup device in accordance with a first embodiment of the present invention, and FIG. 3 is a schematic plan view showing an example of the radiation image pickup device shown in FIG. 2 which is viewed from a photoelectric conversion device side of the radiation image pickup device, wherein FIG. 3 is a schematic plan view of a radiation image pickup device having a plurality of two-dimensional photosensors disposed on a light transmissive substrate. Further, FIG. 4 is a schematic sectional view for explaining the structure when one of photosensor chips which are the photoelectric converting device shown in FIG. 3 is flip chip mounted.

Figure 1:
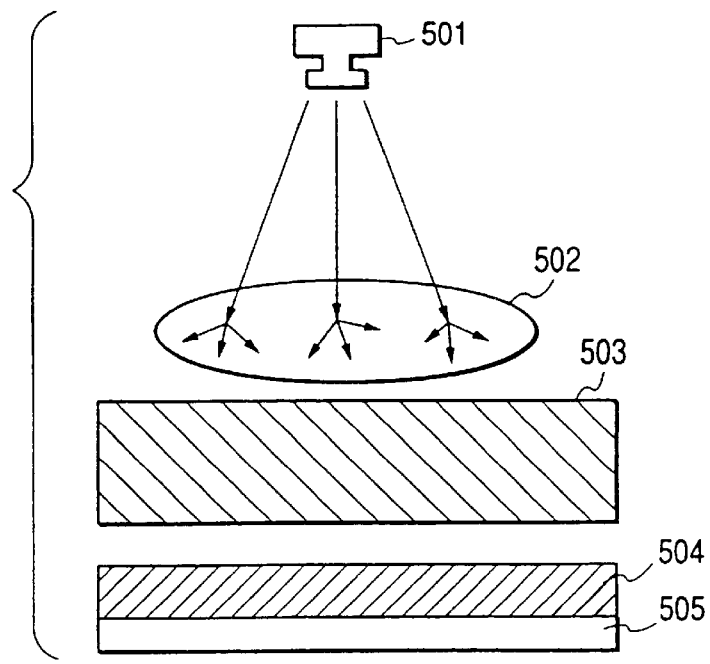
FIG. 1 is a schematic structural view showing an example of an x-ray image pickup device of the film system.

As shown in FIG. 2, in the x-ray image pickup device according to this embodiment, a two-dimensional lens array 301 formed of an acrylic resin, etc. is disposed on a light transmissive substrate 201 such as of glass, etc. through a light transmissive resin layer 302 low in refractive index such as of WORLD ROCK 7702A (refractive index of 1.378) mfd. by Kyoritsu Kagaku Sangyo K.K., and a scintillator 401 is disposed thereon as a wavelength converting member. Although being not illustrated in the figure, the grid shown in FIG. 1 is appropriately disposed on the scintillator 401 or between the scintillator 401 and an object. On a surface of the light transmissive substrate 201 on a side opposite to the lens array 301 disposed side, are disposed CCD solid image pickup elements (photosensor chips) 101 of, e.g., 500×700 (350,000 pixels) two-dimensionally such that 5 elements are arranged at intervals in longitudinal and lateral directions, respectively. These CCD solid image pickup elements 101 resultantly constitute a large-scaled image pickup element of 2,500×3,500 (8,750,000 pixels). The focal distance and the lens diameter of the lens array 301 are appropriately adjusted such that the light from the scintillator 401 is condensed on the respective CCD solid image pickup elements 101.

The image pickup elements of 2,500×3,500 (8,750,000 pixels) are fabricated on the light transmissive substrate 201 as described below.

First, a metal thin film 202 of Al, Cr or the like is vapor deposited through the sputtering method or resistance heating method on the light transmissive substrate 201 at least the surface of which is insulating, and an unnecessary area is etched away by photolithography to pattern the metal thin film 202 in a desired shape. The metal thin film 202 thus patterned becomes a wiring and a terminal for an input/output signal.

Subsequently, a metal bump 103 is provided on each of the terminals 102 of the CCD solid image pickup elements 101, and flip chip connection (bonding) is conducted using a thermosetting anisotropic electrically conductive film 203 having electrically conductive particles 214 between the terminals 202 on the light transmissive substrate 201. On a surface opposite to the CCD solid image pickup elements 101 mounted surface of the thus flip-chip bonded light transmissive substrate 201, are provided the lens array 301 and the scintillator 401 through the resin layer 302.

As the material of the scintillator 401 that absorbs x-rays incident in the direction indicated by arrows in FIG. 2 and converts the x-rays into a light detectable by a photosensor, CsI:Ta, $Gd_2O_2S$:Tb, $Y_2O_2S$:Eu or the like are used. Of these materials, CsI of a columnar crystal is preferable because it efficiently converts the x-rays into visible light and therefore can effectively reduce the amount of x-rays.

The optical information converted by the scintillator 401 is condensed by the lens array 301 and guided to the light receiving surfaces of the CCD solid image pickup elements 101. As a result, an x-ray image pickup device with a large area can be produced.

Figure 6:
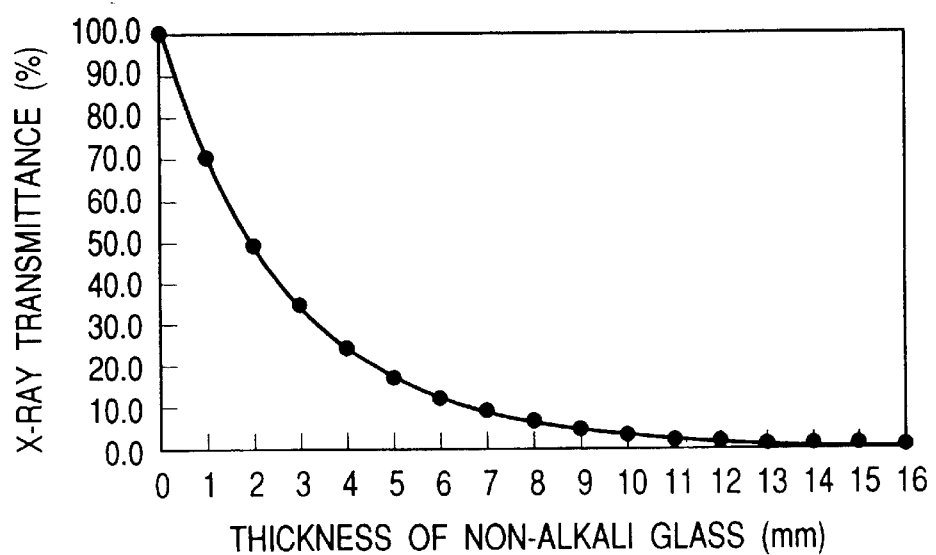
FIG. 6 is a characteristic curve showing a relation between a light transmissive substrate (non-alkali glass) and its x-ray transmittance.

By controlling the thicknesses of the lens array and the light transmissive substrate, those x-rays that have been transmitted by the scintillator can be absorbed by the lens array and the light transmissive substrate. FIG. 6 is a graph illustrating a characteristic curve showing a relation between the thickness of a light transmissive substrate (non-alkali glass) and the x-ray transmittance. As shown in FIG. 6, the greater the thickness of the non-alkali glass, the smaller the x-ray transmittance. For example, when the amount of x-rays is required to be reduced to 1/10, the thickness of the glass is set to about 7 mm, and when the amount of x-rays is required to be reduced to 1/100, the thickness of the glass is set to about 13 mm. In this manner, by suitably reducing the amount of transmitted x-rays, it is possible to reduce the amount of x-rays that reach the photosensor chips (CCD solid image pickup elements 101 in this example), thereby minimizing the occurrence of noise or the like. In order to further reduce the transmission of x-rays, a material high in x-ray shielding effect such as lead may also be incorporated into the glass.

Second Embodiment

Figure 5:
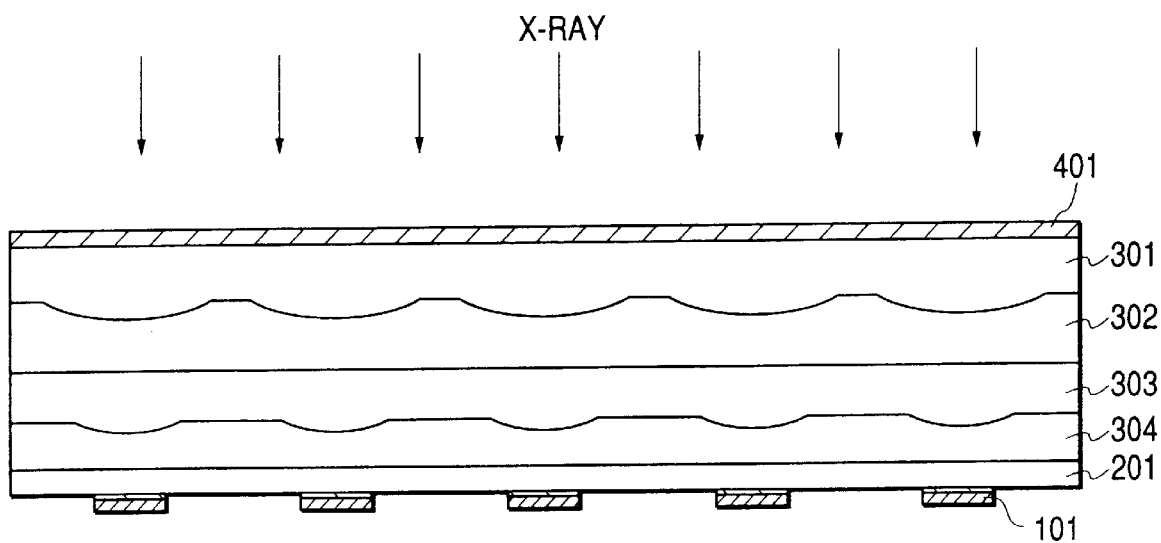
FIG. 5 is a sectional structural view of an x-ray image pickup device showing another embodiment of the present invention.

FIG. 5 is a sectional structural view of an x-ray image pickup device showing a second embodiment of the present invention. In FIG. 5, the same structural members as those in FIG. 2 are designated by identical references, and their description will be omitted.

Referring to FIG. 5, on a surface opposite to the CCD solid image pickup elements 101 mounted surface of the light transmissive substrate 201, a lens array 303 formed of an acrylic resin or the like is disposed through a resin layer 304 of a low refractive index, a lens array 301 formed of an acrylic resin or the like is further disposed thereon through a resin layer 302 of a low refractive index, and a scintillator 401 is disposed thereon.

With the above structure in which the lenses are stuck one on another, the optical information converted by the scintillator 401 can be condensed by the lens array 301 as a first imaging means, and the lens array 303 as a second imaging means can be used to further condense the light and to erect the optical information reversed by the lens array 301, thereby guiding the optical information to the light receiving surface of the CCD solid image pickup elements 101 as an erect image. As a result, it is unnecessary to process the information in which the right and left sides as well as the upper and lower sides are reversed in each of the regions to thereby obtain a single image, and it is possible to collect the information from the respective CCD solid image pickup elements 1, thereby obtaining a large-area image information with ease.

As described above, a large-area x-ray image pickup device can be produced by combining an imaging element such as a lens with the optical system.

Third Embodiment

Figure 7:
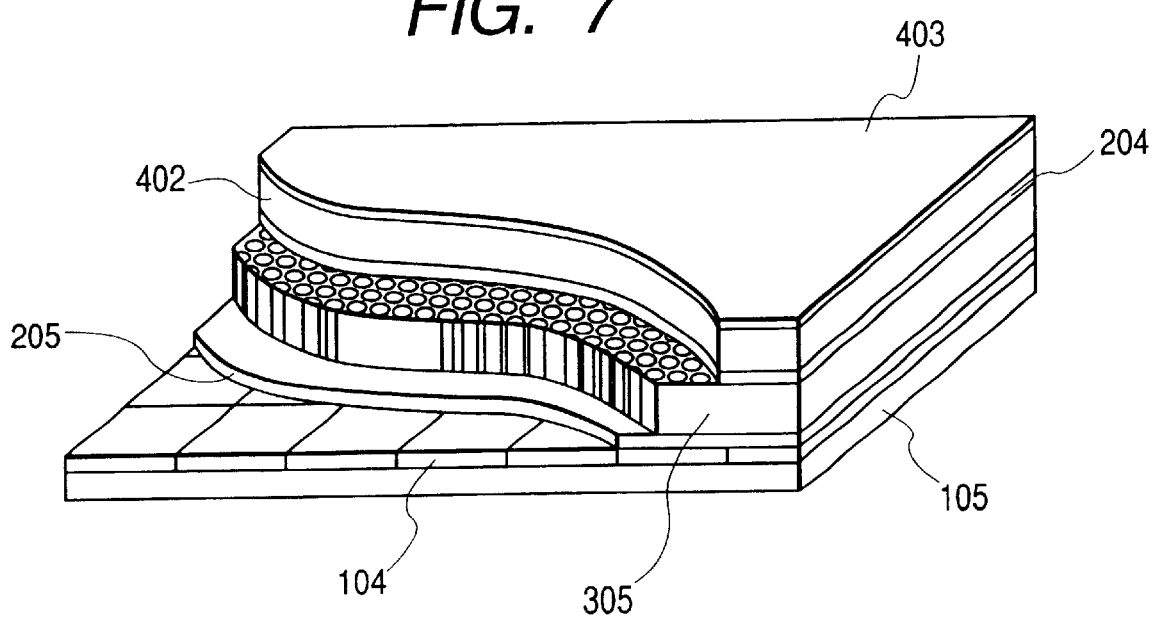
FIG. 7 is a schematic perspective view showing the structure of an x-ray image pickup device showing another embodiment of the present invention.
Figure 8:
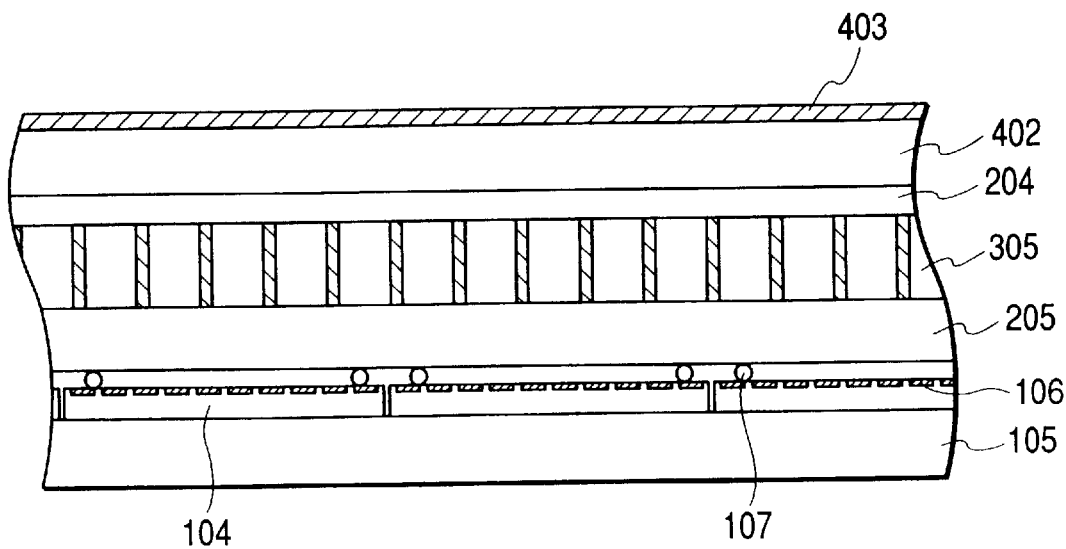
FIG. 8 is a schematic cross-sectional view showing the x-ray image pickup device shown in FIG. 7.

FIG. 7 is a schematic perspective view showing the structure of an x-ray image pickup device showing a third embodiment of the present invention, and FIG. 8 is a schematic sectional view of the x-ray image pickup device shown in FIG. 7.

When a radiation represented by x-rays is incident on semiconductor chips used for a photosensor or an electronic circuit for driving them, the characteristics may be changed, a noise may be increased or malfunction may be caused. In this embodiment, a description will be given of an example of a radiation image pickup device which has excellent sharpness and sensitivity with no, or substantially no, incidence of x-rays on a photosensor chip.

As shown in FIGS. 7 and 8, in the x-ray image pickup device according to this embodiment, on a holding substrate 105 are provided a light reflecting film 403, a phosphor (scintillator) 402 as a wavelength converting member, a light transmissive member 204, a unity magnification erecting lens array 305 which is an accumulation of an optical guiding material of a distributed index type and is capable of imaging an erect image at a short focal point, a light transmissive substrate 205 and a photosensor chip 104 in the mentioned order in the direction of incidence of x-rays.

As the phosphor 402, a rare earth phosphor represented by, for example, cesium iodide (CsI) or $Gd_2O_2S$ can be used as in the above embodiment, and particularly a monocrystalline plate of those materials is preferable because of their small light diffusivity. On the phosphor 402 is formed a thin film obtained by vapor depositing a metal such as aluminum (Al) or the like through the sputtering method or the like as the light reflecting film 403 that serves as a mirror which reflects the light as wavelength-converted by the phosphor 402 to the photosensor chip 104 side. The light reflecting film 403 is not limited to a thin film, but instead a metal plate may be merely bonded to the phosphor 402. It is necessary that the light reflecting film 403 can sufficiently transmit the irradiated radiation such as x-rays. From this viewpoint, aluminum is a preferable material in view of its reflecting function since it sufficiently transmits the x-rays.

As the unity magnification erecting lens array 305, Selfok lens array (SLA) mfd. by Nippon Sheet Glass Co., Ltd. can be configured two-dimensionally and used.

The unity magnification erecting lens array 305 is bonded to the phosphor 402 through the light transmissive member 204 for aligning the focal point of the lens. The light transmissive member 204 may be a light transmissive substrate such as of glass or the like, or an adhesive such as an epoxy resin, etc. used when the transparent phosphor 402 and the unity magnification erecting lens array 305 are bonded to each other can also serve as the light transmissive member 204. If the light transmissive member 204 is of glass, since it has the effects of absorbing and shielding the x-rays, the unity magnification erecting lens array 305 and the photosensor chip 104 can be protected from being damaged by the x-rays. Of course, it is more preferable that a material such as a metal having an x-ray shielding effect such as lead, etc. is incorporated into the glass.

As the photosensor chip 104, the MOS sensor (so-called CMOS sensor) formed through the semiconductor CMOS process is preferably used because it readily constitutes a large-area chip and its power consumption is small. The photosensor chip 104 is electrically connected to a wiring (not shown) disposed on the light transmissive substrate 205 through a metal bump 107 in the same manner as described in the above embodiment. However, in this embodiment, each photosensor chip 104 is disposed closely to an adjacent chip, and a plurality of photosensors within the photosensor chip 104 are disposed with the continuity between the respective chips.

In this case, for example, if the photosensor chip 104 has photosensors 160 $\mu$m in pitch and 896×896 pixels, and if the photosensor chip 104 is made up of 9 chips of 3×3, an x-ray image pickup device having a large area of 43 cm×43 cm and about 7,000,000 pixels can be constituted which is applicable to radiography of any portion including the chest.

As another method of electrical connection with the arranged photosensor chip 104, a hole may opened in a back surface of the photosensor chip 104 and an electrode may be drawn out from the back surface side (not shown), or wiring may extended onto a side of the photosensor chip 104 opposite to the light incident side through a gap between the adjacent photosensor chips 104 by using a flexible wiring substrate or the like and the photosensor chip 104 may be mounted on the holding substrate 105. In this case, the wiring may be formed on the holding substrate 105, or a hole may be opened in the holding substrate 105 and the wiring may be drawn out on the back side of the holding substrate 105.

The light transmissive substrate 205 having the photosensor chips 104 mounted thereon is connected at its opposite surface to the unity magnification erecting lens array 305 with an adhesive or the like.

In the case where the photosensor chips 104 are mounted on the holding substrate 105 as described above, the holding substrate 105 may be adhered to the unity magnification erecting lens array 305 without providing the light transmissive substrate 205 while keeping an interval therebetween by an adhesive or the like.

Also, although being not shown in the figure, an electronic circuit that drives the photosensor chip 104 or processes an output signal is mounted below the holding substrate 105. The holding substrate 105 may be larger than a region where the photosensor chips 104 are disposed to accommodate required wiring and electronic circuits.

Figure 9:
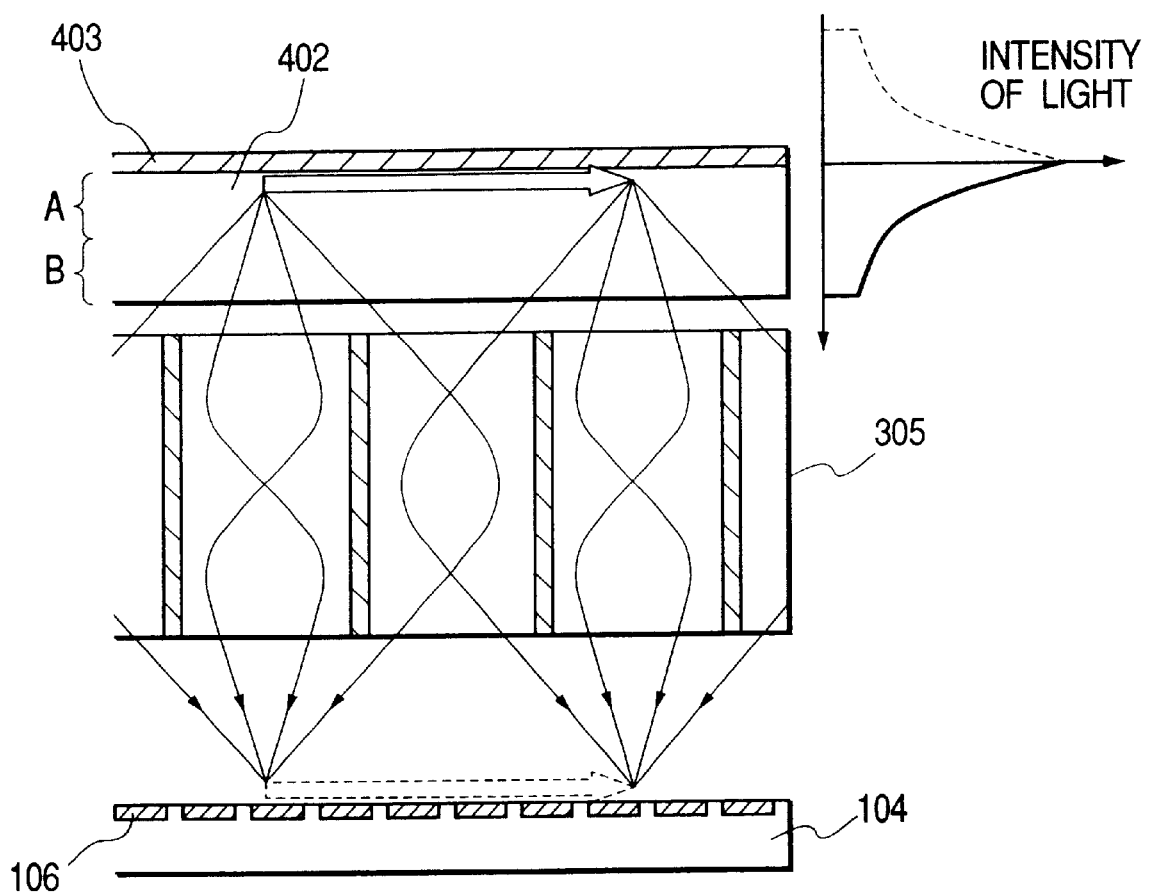
FIG. 9 is a schematic view illustrating the optical action of an x-ray image pickup device of an embodiment of the present invention.

The optical action of this embodiment will be described with reference to FIG. 9. In FIG. 9, members which hardly influence the optical action will be omitted.

Although being not shown in the figure, x-rays having image information are incident from the upper side of the drawing. Then, the x-rays are absorbed by the phosphor 402, and the incident x-ray information is wavelength-converted into light having a wavelength detectable by the photosensor. At this time, as shown in the graph on the right side in FIG. 9, the intensity of emitted light is larger in the vicinity of an upper portion A of the phosphor 402 whereas the intensity of emitted light is smaller in the vicinity of a lower portion B of the phosphor 402. The emitted light is isotropically radiated, and half of the emitted light is incident to the unity magnification erecting lens 305 while the other half is incident to the light reflecting film 403 on the upper side and mirror-reflected. Because the reflected light is made incident to the unity magnification erecting lens array 305, twice as much light as in the case where no light reflecting film 403 is disposed is made incident to the unity magnification erecting lens array 305. For that reason, the provision of the light reflecting film doubles, or substantially doubles, the sensitivity of the device. The reflected light has an action which is equivalent as that in the case where light is emitted with a light intensity indicated by a broken line in the graph on the right side in FIG. 9.

The unity magnification erecting lens array 305 is disposed such that the light emitted in the vicinity of the upper portion A within the phosphor 402 is focussed on the surface of the photosensor 106 which is a pixel within the photosensor chip 104.

As shown in FIG. 9, because the unity magnification erecting lens focuses an image at a unity magnification (1:1 magnification) erectly, a light emitted from one point is imaged at one point at the photosensor side even if the light is incident on any lenses, as indicated by the arrow in the figure. Accordingly, even if the light is incident on a plurality of lens, the image is not disordered. Also, even if the light is incident on one photosensor from a plurality of lenses, the image is not disordered. This is the character of the unity magnification erecting lens array. As a result, it is unnecessary to dispose a light shielding wall on the boundary of adjacent lenses or to complicatedly adjust the lateral positions of the lenses with respect to the photosensor chip 104 in order to prevent that the light incident on or emitted from the light incident surface or the light emitting surface of the lens is incident on or emitted from an unintended lens. Also, the width of one lens can freely be determined and can be made larger than the pixel pitch as shown in FIG. 9. Also, because a specific light shielding means is not required, the lenses can be disposed closely to each other.

Further, because the lenses themselves can have a sufficient thickness to absorb x-rays and can be disposed without any gaps therebetween, the unity magnification erecting lens array 305 per se acts as a radiation absorbing member and can have the effect of preventing the radiation from being incident on the photosensor chip 104.

The light emitted in the vicinity of the lower portion B of the phosphor 402 is not completely imaged on the surface of the photosensor 106 but contributes to improvement of the sensitivity of the radiation image pickup device due to increase of the amount of light.

The effect of this embodiment will be described with reference to FIGS. 10A and 10B. Also, the optical action in a case where the unity magnification erecting lens array is not employed will be described with reference to FIGS. 11A and 11B together.

Figure 10A:
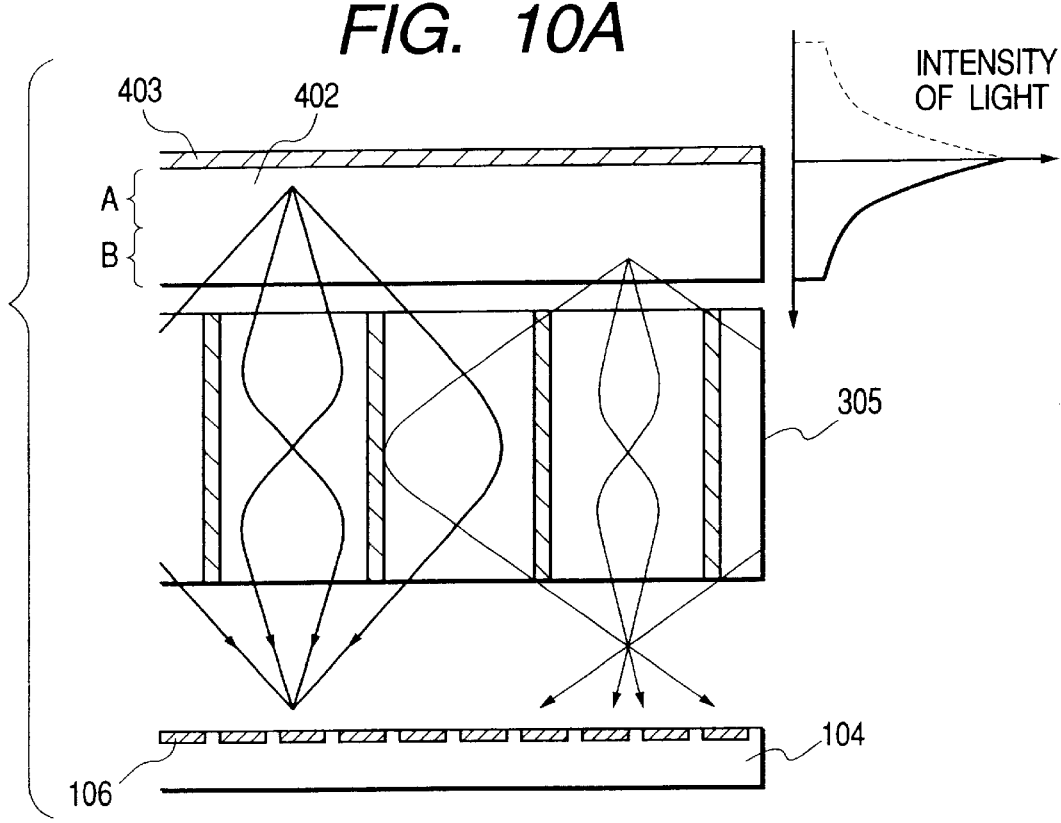
FIGS. 10A and 10B are schematic views illustrating the technical effect of an x-ray image pickup device of an embodiment of the present invention.

As indicated by the thick solid line in FIG. 10A, the light emitted in the vicinity of the upper portion A of the transparent phosphor 402 is imaged on the surface of the photosensor 106. Therefore, as shown by the curve A in the graph of FIG. 10B, the light distribution on the surface of the photosensor 106 is narrow in width and small in blur. Also, because the intensity of light in the vicinity of the upper portion A of the transparent phosphor 402 is large as shown in the right side graph, the amount of light is large. That is, the light emitted in the vicinity of the upper portion A of the transparent phosphor 402 forms a bright image with a small blur on the surface of the photosensor 106.

On the contrary, as indicated by a thin solid line in FIG. 10A, the light emitted in the vicinity of the lower portion B of the transparent phosphor 402 is not focused on the surface of the photosensor 106. Therefore, as shown by the curve B in the graph of FIG. 10B, the light distribution on the surface of the photosensor 106 is wide in width and large in blur. Also, because the intensity of light in the vicinity of the lower portion B of the transparent phosphor 402 is small as shown in the right side graph, the amount of light is small. That is, the light emitted in the vicinity of the lower portion B of the transparent phosphor 402 forms a dark image with a large blur on the surface of the photosensor 106.

Figure 10B:
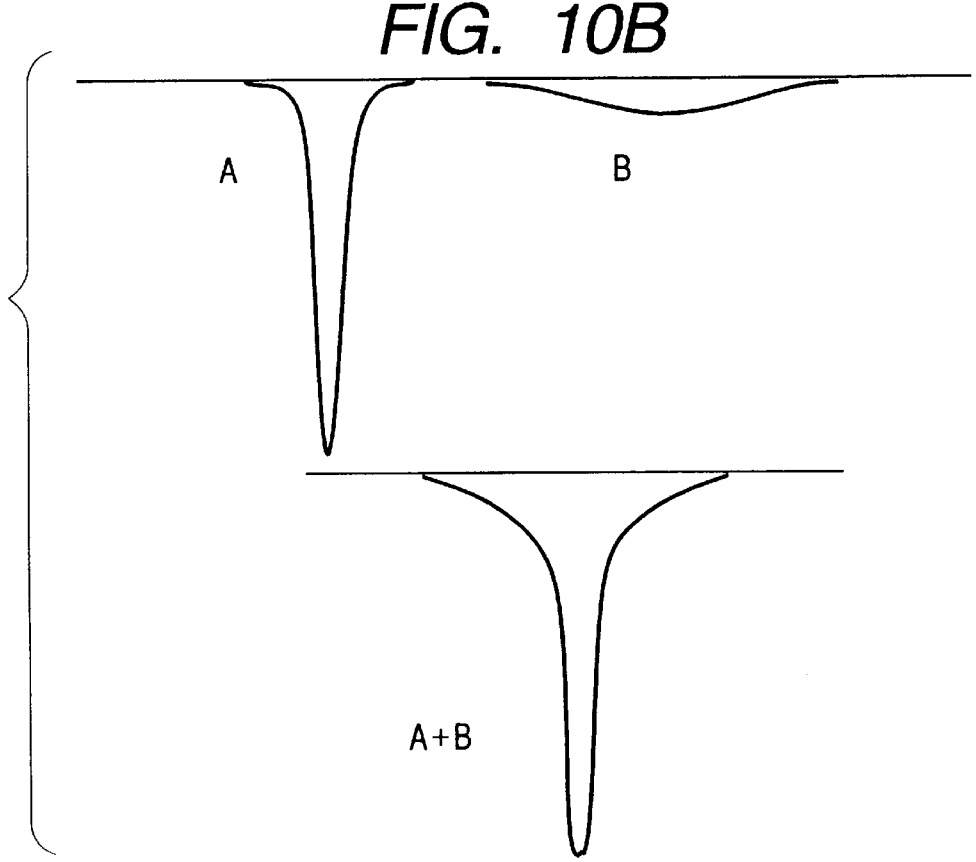

In practice, because the lights emitted at the upper portion A and the lower portion B of the x-ray image act on the light receiving surface of the same photosensor 106, the total light distribution is as shown by the curve A+B in the graph of FIG. 10B, and it is seen that the sharpness is sufficiently high. If the thickness of the phosphor 402 is increased and the light in the vicinity of the upper portion A is imaged in order to improve the sensitivity of the device, that is, in order to increase the rate of the radiation such as x-rays which is wavelength-converted, the sensitivity can be improved without largely degrading the sharpness. Also, if the phosphor 402 is made large in thickness sufficient to absorb the x-rays, it is possible to allow the phosphor 402 per se to act as a radiation absorbing member, thereby preventing the radiation from being incident on the photosensor chip 104.

On the other hand, an example in which no unity magnification erecting lens array is employed will be described with reference to FIGS. 11A and 11B.

Figure 11A:
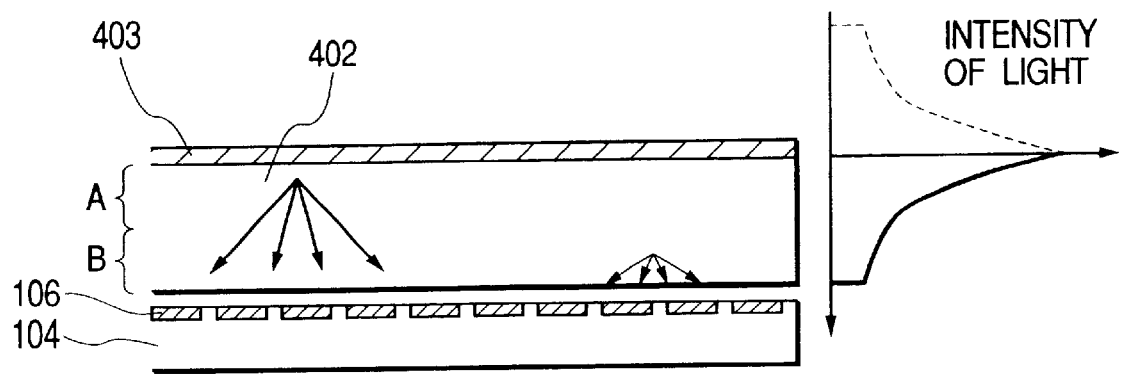
FIGS. 11A and 11B are schematic views illustrating the optical action of an x-ray image pickup device of an embodiment of the present invention.

As indicated by a thick solid line of FIG. 11A, the light emitted in the vicinity of the upper portion A of the transparent phosphor 402 is spread on the light receiving surface of the photosensor 106 in accordance with the distance to the photosensor 106. For that reason, as shown by the curve A in the graph of FIG. 11B, the light distribution on the light receiving surface of the photosensor 106 becomes wide in width. Also, because the intensity of light in the vicinity of the upper portion A of the phosphor 402 is large as shown in the graph on the right side in FIG. 11A, the amount of light is large. That is, the light emitted in the vicinity of the upper portion A of the transparent phosphor 402 is spread on the surface of the photosensor 106 and is bright.

On the other hand, as indicated by a thin solid line of FIG. 11A, the light emitted in the vicinity of the lower portion B of the transparent phosphor 402 is not spread so much since the distance to the light receiving surface of the photosensor 106 is not large.

Figure 11B:
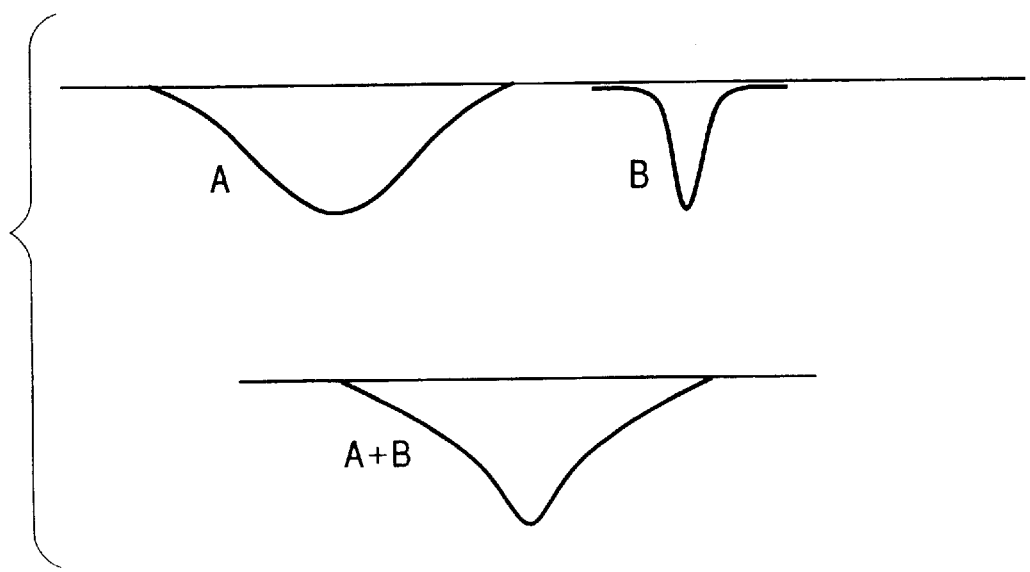

For that reason, as shown by the curve B in the graph of FIG. 11B, the light distribution on the surface of the photosensor 106 becomes narrow in width. Also, because the intensity of light in the vicinity of the lower portion B of the phosphor 402 is small as shown in the graph on the right side in FIG. 11A, the amount of light per se is also small. That is, the light emitted in the vicinity of the lower portion B of the transparent phosphor 402 is less spread on the surface of the photosensor 106 but corresponds to the intensity of emitted light.

Accordingly, the total light distribution is as shown in the curve A+B in the graph of FIG. 11B and becomes lower in sharpness as compared with the case where the imaging means is employed. If the thickness of the transparent phosphor 402 is increased in order to improve the sensitivity of the device, because the light in the vicinity of the upper portion A is further spread and the light in the vicinity of the lower portion B which is less spread becomes smaller in the intensity of emitted light, there is a case where the sharpness of the image is largely degraded. As described above, in the case where no imaging optical system such as a lens is employed, the thickness of the phosphor cannot be increased more than some degree, and it is difficult to provide a device with higher sensitivity. Also, because the phosphor 402 cannot be sufficiently thickened, it is difficult to prevent the radiation from being incident to the photosensor chip 104 by using the phosphor 402.

In this embodiment, it is preferable that the phosphor diffuses only a small portion of the light inside the phosphor. However, if the phosphor does not completely diffuse the light, imaging is enabled by the unity magnification erecting lens array. Also, it is preferable from the viewpoints of sharpness and sensitivity that the light reflecting film on the upper portion of the phosphor has a mirror surface and is high in the mirror effect, but even a light reflecting plate with a diffusivity can be employed. Also, even if no light reflecting film is provided, the basic effects of this embodiment are not lost.

Subsequently, a description will be given of an example where the light emitted on which position of the phosphor 402 is preferably imaged on the surface of the photosensor 106 by the unity magnification erecting lens array 305.

As shown in FIGS. 10A and 10B, it is effective that the light at a portion where the intensity of emitted light is the strongest is mainly imaged. In the case where the light reflecting surface 403 has a mirror surface, since it is presumed that the intensity of light is shown by the sum of the solid line and the broken line in the graph on the right side in FIG. 10A, it is optimum that a light at an interface between the transparent phosphor 402 and the light reflecting film 403, that is, a light at an end surface of the phosphor 402 on the radiation incident side is imaged on the surface of the photosensor 106.

Also, in the case where the light reflecting film 403 is strong in diffusivity, the distribution of the intensity of light in this case is considered to be equivalent to the case where the light component indicated by the broken line is mainly concentrated on the interface between the phosphor 402 and the light reflecting film 403. Similarly, in this case, it is also optimum that the light on the end surface of the phosphor 402 on the radiation incident side is imaged on the surface of the photosensor 106.

In the case where no light reflecting film is provided, the sharpness is increased more in the case where the light at a position slightly lower than the end surface on the radiation incident side within the lower portion A of the phosphor 402 is imaged, taking the blur on the imaging surface into account. The position may preferably be a position lower by a half amount of the pixel pitch of the photosensor 106 than the interface between the phosphor 402 and the light reflecting film 403, that is, the end surface of the phosphor 402 on the radiation incident side. This is because, with the above position, most of the strongest light from the end surface of the phosphor 402 on the radiation incident side is incident on an intended photosensor and is hardly incident on photosensor pixels adjacent thereto. Specifically, in the case where the photosensors 106 are disposed at a pitch of 160 $\mu$m, the position of the light to be mainly imaged may preferably be a position lower than the end surface of the phosphor 402 on the radiation incident side by about 80 $\mu$m.

Also, as a mounting method different from this embodiment, the phosphor 402, the unity magnification erecting lens array 305 and the photosensor chip 104 may be mechanically held with a space therebetween without using either one or both of the light transmissive member 204 and the light transmissive substrate 205. This is particularly because the unity magnification erecting array 305 per se has an action of absorbing x-rays to protect the photosensor chip from the x-rays, so that it is possible to make any special member unnecessary.

According to this embodiment, the use of the unity magnification erecting lens array prevents different images from interfering with each other between lenses even if no light shielding member is provided between the lenses. As a result, a radiation image pickup device with a high sharpness can be obtained. Also, it is possible to arrange the lenses closely to each other and provide the lens array per se with the effect of protecting the photosensor chip and other electronic circuits from x-rays, so that a compact radiation image pickup device can be obtained.

Also, since the light is imaged by using the lenses, the phosphor light emitting portion and the photosensor can be disposed apart from each other, and the light transmissive substrate or the light transmissive member which act as a radiation absorbing member while keeping the sharpness can be mounted on the phosphor side of the lens or the photosensor chip side. Further, the photosensor chips can be electrically connected to each other on the light transmissive substrate, thereby obtaining a more compact radiation image pickup device.

In this embodiment, because the light of a large emission intensity in the vicinity of the radiation incident side within the phosphor can be imaged on the photosensor by using the imaging optical system, the sensitivity can be improved while keeping the sharpness. Also, there can be greatly obtained the actions of improving the sensitivity of the radiation image pickup device by thickening the phosphor and also of protecting the photosensor chips from x-rays by absorbing the x-rays by the phosphor per se. Further, because the light reflecting film is disposed on the phosphor, a radiation image pickup device with high sharpness and sensitivity can be obtained. Those effects are further increased if a phosphor with no or less diffusivity or a light reflecting plate with a mirror surface exhibiting a strong mirror effect is employed.

Subsequently, an x-ray image pickup system using the x-ray image pickup device according to the present invention will be described.

Figure 12:
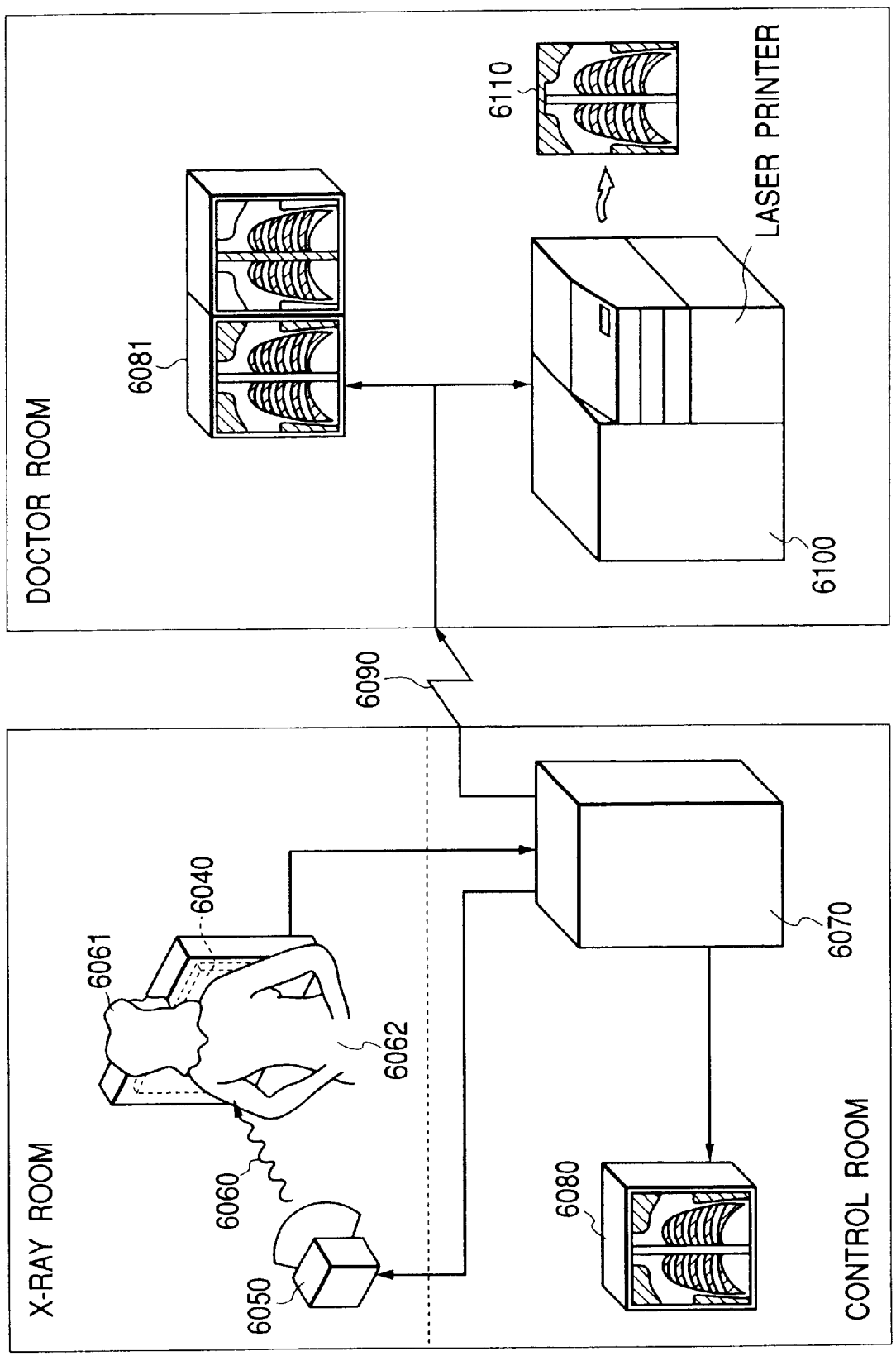
FIG. 12 is a schematic view illustrating an example of applying an x-ray image pickup device to an x-ray diagnosing system.

FIG. 12 is a view showing an example of application of the x-ray image pickup device according to the present invention to an x-ray diagnosing system.

X-rays 6060 generated in an x-ray tube 6050 are transmitted by an observed portion 6062 such as chest portion of a patient or an object 6061 and are then made incident on a photoelectric converting device (x-ray image pickup device) 6040 having a scintillator mounted on the upper portion thereof as a wavelength converting member. The incident x-rays comprise information regarding the inside of the object 6061. The scintillator emits a light in accordance with the incident x-rays and converts the light into an electric signal, thus obtaining electric information. The information is converted to a digital signal, picture processed with an image processor 6070 and can be observed by a display 6080 within a control room.

Also, the above information can be transferred to a distant place through a transmitting means such as a telephone line or radiocommunication 6090, and a doctor at a distant place can conduct diagnosis in a doctor room by displaying the information on a display 6081 or by outputting the information to a film, etc. The information obtained can be recorded or saved in a recording medium using various recording materials such as an optical disc, a photomagnetic disc or a magnetic disc, or a recording medium 6110 such as a film or paper through a recording means 6100 such as a film processor.

The above-described x-ray image pickup device is not particularly limited to a medical device but is applicable to non-destructive examination or the like. Also, the CCD solid image pickup element may be replaced by a MOS solid image pickup element.

As was described above, according to the present invention, there can be provided a radiation image pickup device high in sensitivity which can be miniaturized and can stably read an image.

Also, there can be provided an irradiation image pickup device that is high in the degree of freedom of the size of the image pickup region and is capable of reading a radiation image at a low cost with a high performance.

In addition, a radiation image pickup system having the radiation image pickup device can be high in reliability, shorten the diagnosis time and further improve the certainty of the diagnosis, and also can reduce the amount of work necessary to prepare for radiography of an object and the setting cost. Also, since the running costs of the system are lowered, the costs for non-destructive examination can be reduced.

Also, by arranging a wavelength converting member such as a scintillator which converts a radiation into a light of the sensitive wavelength region of a detecting means (e.g., photosensor), an imaging optical system that guides the light from the wavelength converting member, and a plurality of photosensors that receive the light from the wavelength converting member in the stated order in the radiation incident direction, and by providing a radiation shielding member for reducing the amount of radiation that reaches the photosensor, there can be obtained a radiation image pickup device which is not adversely affected by a radiation such as x-rays, is compact, and has high sharpness and sensitivity.

Further, by disposing the light transmissive substrate such as glass as the radiation shielding member between the wavelength converting member and the optical sensor chip, or by disposing the unity magnification erecting optical system such as a unity magnification optical system which utilizes a light guiding material of the distributed index type as the radiation shielding member between the wavelength converting member and the photosensor chip, the input of a radiation to the photosensor chip can be effectively eliminated or reduced, thereby reducing or eliminating damage to a semiconductor device represented by the photosensor chip and minimizing noise. The erecting optical system and the light transmissive substrate may be used in combination.

Also, if the photosensor chip is fixedly disposed on a surface of the light transmissive substrate which serves as the radiation shielding member, a plurality of chips can be readily disposed. The optical sensor chips can be disposed without any gaps therebetween, and if the number of photosensor chips is increased, a large-scale radiation image pickup device having a desired size can be obtained.

As described above, by using the unity magnification erecting lens array which is a unity magnification erecting optical system also as the radiation shielding member, there can be obtained a compact radiation image pickup device which is small in the number of parts.

When a transparent phosphor which diffuses a small amount of light is used as the wavelength converting member, there can be obtained a radiation image pickup device which is greatly improved in sensitivity without lowering sharpness. In particular, monocrystalline cesium iodide (CsI) and $Gd_2O_2S$ are more preferable because they have high transparency.

Also, according to the present invention, by arranging two-dimensional photosensors on one surface of a light transmissive substrate, and arranging a lens array that serves as a demagnifying optical system and a wavelength converting member on the other surface, a large-area, compact radiation image pickup device can be obtained.

Further, by controlling the thicknesses of the lens array and the light transmissive substrate, it is possible to allow the lens array and the light transmissive substrate to absorb those x-rays which pass through the wavelength converting member to thereby shield the x-rays that reach the semiconductor device such as a photosensor, thus preventing devices such as two-dimensionally arranged photosensors from being destroyed due to charges generated by the x-rays and preventing the sensor output characteristics from being adversely affected by those charges (in particular, S/N is degraded), or the like.

Still further, according to the present invention, the demand for digitalizing the x-ray image information which has been strongly desired in the medical industry in recent years is satisfied, the efficiency of medical examination within a hospital can be significantly improved. Further, medical diagnosis information network can be structured between distant places, with the result that the efficiency of diagnosis can be improved over the entire medical field such that medical care is available in a hospital by utilizing a diagnosis information obtained from another distant hospital.

The above description is applied to the structure of the two-dimensional radiation image pickup device. However, the present invention is not limited to the two-dimensional radiation image pickup device, but applicable to a one-dimensional radiation image pickup device, likewise. As a result, the radiation image pickup device of the present invention can be used for a line sensor for measurement of the density of a bone, an industrial x-ray image pickup line sensor, and so on.

In addition, the present invention is not limited to the above-described embodiments, but the modifications and combination can be appropriately included within the subject matter of the present invention.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A radiation image pickup device comprising:
   a wavelength converting member that converts a wavelength of an incident radiation into a light;
   an imaging optical system comprising an optical lens that condenses the light from said wavelength converting member;
   a plurality of photosensors that receive a light from said imaging optical system; and
   a light transmissive substrate disposed between said plurality of photosensors and said wavelength converting member, that reduces x-rays that have passed through said wavelength converting member,
   wherein said plurality of photosensors are arranged on said light transmissive substrate.

2. The radiation image pickup device according to claim 1, wherein each photosensor in said plurality of photosensors is two-dimensional and terminals of a wiring formed on said light transmissive substrate are electrically fixedly connected to terminals formed on said plurality of two-dimensional photosensors through metal members.

3. The radiation image pickup device according to any one of claim 1 or 2, wherein said plurality of photosensors are two-dimensionally disposed.

4. The radiation image pickup device according to any one of claim 1 or 2, wherein each photosensor of said plurality of photosensors comprises a solid image pickup element having a one-dimensional or two-dimensional light receiving element region.

5. The radiation image pickup device according to claim 4, wherein the solid image pickup element is a CCD or MOS solid image pickup element.

6. The radiation image pickup device according to any one of claim 1 or 2, wherein the radiation is x-ray radiation, and wherein the thicknesses of said imaging optical system and said light transmissive substrate are sufficient to absorb x-rays which have passed through said wavelength converting member.

7. The radiation image pickup device according to any one of claim 1 or 2 , wherein the imaging optical system comprises an erecting lens.

8. The radiation image pickup device according to claim 7, wherein the erecting lens has a unity magnification.

9. A radiation image pickup system comprising:
   a radiation image pickup device according to any one of claim 1 or 2;
   a signal processor that processes a signal from the radiation image pickup device;
   a display that displays a signal from said signal processor; and
   a radiation source that generates the radiation.

10. The radiation image pickup system according to claim 9, further comprising a recording means for recording a signal from said signal processor, or a transmission processor that transmits a signal from said signal processor.

11. The radiation image pickup device according to claim 1, wherein the optical lens comprises a plurality of optical lenses.

12. A radiation image pickup device comprising:

a wavelength converting member that converts a radiation into a light;

an erectly imaging optical system that condenses the light from said wavelength converting member, said erectly imaging optical system comprising an erecting lens array arranged one-dimensionally or two-dimensionally; and a plurality of photosensors that receive the light from said erectly imaging optical system.

13. The radiation image pickup device according to claim 12, wherein said erectly imaging optical system comprises a unity magnification erecting lens array.

14. The radiation image pickup device according to any one of claims 12 to 13, wherein the radiation is x-ray radiation, and wherein the thickness of an optical member of said erectly imaging optical system is sufficient to absorb x-rays which have passed through said wavelength converting member.

15. The radiation image pickup device according to claim 12, wherein said plurality of photosensors are arranged one-dimensionally or two-dimensionally.

16. The radiation image pickup device according to claim 12, wherein each photosensor of said plurality of photosensors comprises a solid image pickup element having a one-dimensional or two-dimensional light receiving element region.

17. The radiation image pickup device according to claim 16, wherein the solid image pickup element is a CCD or MOS solid image pickup element.

18. The radiation image pickup device according to claim 12, wherein said wavelength converting member comprises a transparent phosphor.

19. The radiation image pickup device according to claim 18, wherein the transparent phosphor comprises a monocrystalline material.

20. The radiation image pickup device according to claim 12, wherein said erectly imaging optical system forms on said plurality of photosensors an image of the light converted in the vicinity of a radiation incident side surface of said wavelength converting member.

21. The radiation image pickup device according to claim 12, further comprising a reflecting film on a radiation incident side surface of said wavelength converting member.

22. The radiation image pickup device according to claim 12, further comprising a reflecting film on a radiation incident side surface of said wavelength converting member, wherein said erectly imaging optical system forms on said plurality of photosensors an image of the light converted in the vicinity of a radiation incident side surface of said wavelength converting member.

23. A radiation image pickup system comprising:

a radiation image pickup device according to any one of claims 12, 15–17, and 18–22;

a signal processor that processes a signal from said radiation image pickup device;

a display that displays a signal from said signal processor; and a radiation source that generates the radiation.

24. The radiation image pickup system according to claim 23, further comprising a recording means for recording a signal from said signal processor, or a transmission processor that transmits a signal from said signal processor.

25. A radiation image pickup device comprising:

a wavelength converting member that converts a wavelength of an incident radiation into a light;

a lens array that condenses the light from said wavelength converting member:

a photosensor that receives a light from the lens array, said photosensor comprising a solid image pickup element having a one-dimensional or two-dimensional light receiving element region; and a light transmissive substrate disposed between said photosensor and said wavelength converting member, for reducing x-rays which have passed through said wavelength converting member, wherein said photosensor is arranged on said light transmissive substrate.

26. The radiation image pickup device according to claim 25, wherein the solid image pickup element is a CCD or MOS solid image pickup element.

* * * * *

UNITED STATES PATENT AND TRADEMARK OFFICE
CERTIFICATE OF CORRECTION

PATENT NO. : 6,528,796 B1  
DATED : March 4, 2003  
INVENTOR(S) : Noriyuki Kaifu et al.

It is certified that error appears in the above-identified patent and that said Letters Patent is hereby corrected as shown below:

Column 1,  
Line 25, "to" should read -- to as --.  
Line 57, "visits" should read -- visits the --.  
Line 59, "be also" should read -- also be --.

Column 2,  
Line 14, "there" should read -- there has --.

Column 5,  
Line 33, "flip chip" should read -- flip-chip --.

Column 7,  
Lines 48 and 51, "may" should read -- may be --.

Column 14,  
Line 48, "2," should read -- 2, --.

Column 16,  
Line 12, "claims 12, 15-17, and 18-22;" should read -- claims 12 and 15-22; --.  
Line 26, "member:" should read -- member; --.

Signed and Sealed this

Seventh Day of October, 2003

JAMES E. ROGAN  
*Director of the United States Patent and Trademark Office*